Patented Aug. 19, 1924.

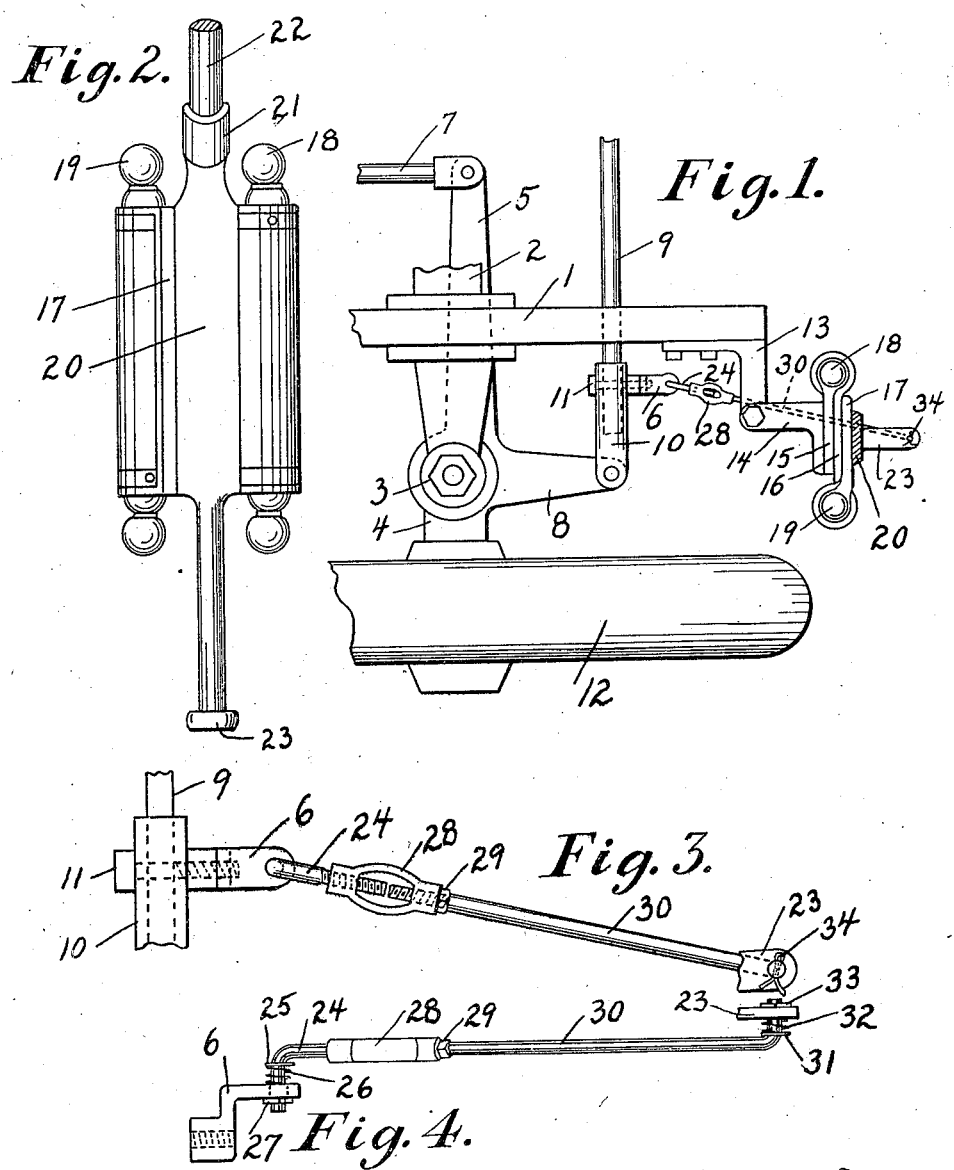

1,505,795

UNITED STATES PATENT OFFICE.

JOSHUA B. NICHOLSON, OF WASHINGTON, DISTRICT OF COLUMBIA.

CONNECTION FOR DIRIGIBLE LIGHTS.

Application filed October 16, 1923. Serial No. 668,824.

*To all whom it may concern:*

Be it known that I, JOSHUA B. NICHOLSON, a resident of Washington, District of Columbia, and a citizen of the United States, have invented certain new and useful Improvements in Connections for Dirigible Lights, of which the following is a specification, reference being had to the accompanying drawing, forming a part thereof.

My invention relates to connections for dirigible lights and has for its object, to provide a simple, efficient and inexpensive device that can be readily attached to a steering rod of an automobile to cause the lights to turn in the same direction as the wheels so as to enable the driver to see ahead when rounding a curve.

A further object of my invention is to provide such a connection that can be readily attached without the necessity of drilling or otherwise marring the machine.

A further object of my invention is to provide such a connection which will be adapted to relieve the strain upon the lights due to travel over rough roads and bumps.

With the above objects described and other objects hereinafter explained, in view my invention consists in the construction and combination of elements hereinafter described and claimed.

Referring to the drawings:—

Figure 1 is a top partial section view of the front of an automobile showing a bracket for a dirigible light as attached to the chassis, with my device in place.

Figure 2 is a vertical front view of a dirigible light support as embodied in my former Patent #935,437 to which my device is applicable.

Figure 3 is a top plan view of my connection.

Figure 4 is a horizontal side view of the same.

In the drawings 1 indicates the chassis of an automobile, 2 a portion of the front spring, 3 the nut of king pin and 4 the front right hub which extends through the bearing in the front right wheel 12. An arm 5 formed integrally with the hub 4 is attached by pivotal means to the rod 7 which rod is attached by suitable means to the steering wheel. A forwardly extending arm 8 is also formed integrally with the arm 5 and the hub 4 and is provided at its forward end with a hole. One end of socket 10 is adapted to be pivotally attached by means of a bolt to the forwardly extending arm 8. The other end of the socket 10 is bored to a sufficient diameter and depth to receive the rod 9, the other end of the rod being attached by similar means to the left front wheel. One end of the angle bracket 13 is attached by means of bolts to the chassis 1 while the other end is drilled to receive a bolt passing through one end of the bracket 14 which bolt causes the two brackets to become rigidly united. The other end of bracket 14 is connected by suitable means to the rearward leaf 15 of the double acting spring 16 while the forward leaf 17 has attached thereto the plate 20 which carries at its upper end the means for containing the light. At the lower end of the plate 20 is a forwardly extending arm 23 adapted to receive at its forward end one end of the rod 30 which passes through the opening in the forwardly extending arm 23, through a washer 33 and is held in place by a cotter pin 34 or any other suitable means. Interposed between the forwardly extending arm 23 and the bend in the rod 30 is a spring 32 and a washer 31 which spring takes the strain and motion, caused by the wheels passing over rough roads and bumps, from the head lights.

The other end of the rod 30 is screwthreaded and adapted to receive the internal screwthreads of the turnbuckle 28, they both being held in the desired position by the lock nut 29. The other end of the turnbuckle 28 is also screwthreaded internally and is adapted to receive the screwthreaded end of the rod 24, the other end of which is bent at an angle and passes through an opening in the end of the bracket 6, through the washer 27 and is held in place by a cotter pin or other suitable means.

Interposed between the forwardly extending arm of the bracket 6 and the angular bend in the rod 24 is a washer 25 and a spring 26 which serves the same purpose as the spring 32, namely, to relieve the strain and motion, caused by rough roads and bumps, from the head lights. The rearwardly extending arm of the bracket 6 is internally screwthreaded and adapted to be secured to the underside of the socket 10 and held rigidly in place by the bolt 11 which is part of the usual construction of automobiles.

In operation of my device the driver turns the wheel to the left which causes the rod 7 to be moved rearwardly carrying with it the arm 5. This arm 5 is pivoted at 3 which causes the forwardly extending arm 8 and the hub 4 to also pivot at 3 and move towards the left. The socket 10 which is pivoted to the forwardly extending arm 8 is moved to the left carrying with it the bracket 6 which in turn draws the rod 30 with it and being also attached to the forwardly extending arm 32 which controls the movement of the light, is pivoted about the point 18 causing the light to be thrown to the left or in the direction in which the car is about to turn.

When the driver turns the wheel to go to the right the rod 9 and the socket 10 are forced towards the right carrying with it the bracket 6, forcing the rod 30 forward causing the leaf 17 to pivot about the point 19 and throw the rays of light towards the right.

The two operations work simultaneously on both sides of the car.

Having thus described my invention what I claim is:—

A connection for dirigible head lights comprising a Z shaped bracket having one end rigidly attached to the tie rod of an automobile and the other end provided with a bearing hole adapted to receive the depending end of a rod, and having interposed between a washer on the depending end and the bracket a spring to absorb the shock due to bumps and holes in the road and means for preventing said depending end from becoming disengaged, a similar rod having its forward end upturned and adapted to fit into a bearing hole contained in the forwardly extending arm of the lamp bracket and having interposed between a washer on the upturned end and the underside of said forwardly extending arm a similar spring to absorb the shock due to bumps and holes in the road, and means for preventing said upturned end from becoming disengaged, and a turnbuckle interposed between the two rods and adapted to be screwed onto each rod to provide the necessary tension on said connecting rod.

In testimony whereof I hereunto affix my signature.

JOSHUA B. NICHOLSON.